US009631938B2

(12) United States Patent
Axelrod

(10) Patent No.: US 9,631,938 B2
(45) Date of Patent: Apr. 25, 2017

(54) ROUTE PLANNING SYSTEM AND METHOD

(71) Applicant: Baruch Axelrod, Givat Shmuel (IL)

(72) Inventor: Baruch Axelrod, Givat Shmuel (IL)

( * ) Notice: Subject to any disclaimer, the term of this patent is extended or adjusted under 35 U.S.C. 154(b) by 0 days.

(21) Appl. No.: 14/816,009

(22) Filed: Aug. 2, 2015

(65) Prior Publication Data

US 2017/0030724 A1 Feb. 2, 2017

(51) Int. Cl.
*G01C 21/34* (2006.01)
(52) U.S. Cl.
CPC ................... *G01C 21/34* (2013.01)
(58) Field of Classification Search
CPC ....................................... G01C 21/34
USPC .......................................... 701/533
See application file for complete search history.

(56) References Cited

U.S. PATENT DOCUMENTS 6,232,915 B1 * 5/2001 Dean ................ G08G 1/20
342/357.31
2007/0294028 A1 * 12/2007 Gray ................ G01C 21/343
701/533

* cited by examiner

*Primary Examiner* — Brian P Sweeney
(74) *Attorney, Agent, or Firm* — Novick, Kim & Lee, PLLC; Jae Youn Kim

(57) ABSTRACT

A computerized method for calculating a route via a plurality of addresses, each address associated with a geocode. The method relates to calculating an efficient route travelling through a large number of addresses (over 10, over 50, over 100 and more). The efficient route calculated may probably not be the absolute best route possible, but it will be a good route calculated quickly online in an interactive application, and thus produce a good result, typically under one, three or five minutes.

10 Claims, 5 Drawing Sheets

ROUTE PLANNING SYSTEM AND METHOD

TECHNICAL FIELD

The present invention relates to route planning in general, and in particular to computerized methods and systems for efficiently calculating an optimal route via a plurality of points.

BACKGROUND ART

The problem of planning an optimized route via a plurality of points has been known for many years and there are many algorithms to find the best way according to one or more predefined criteria such as: shortest way, shortest time etc. The problem, also referred to as "Travelling Salesman", is relevant when someone wishes to visit a many points in the same territory. The points can be different addresses in the same city, different cities in the same state or country and even different countries. The visits may be personal visits or delivering merchandize.

Planning a route connecting a small number of points (say up to about 10 points) may not be a too difficult task for an experienced person who knows the territory well, and it can usually be accomplished manually in a reasonable time frame using a map and simple logic. For example, one can select a starting point and then proceed to the next closest location and so on. Following this process carefully can produce an optimal route or a route which will be very close to it.

When it comes to planning a route with dozens or hundreds (or even more) points, one cannot solve this problem efficiently with manual solutions. A large number of points requires a computerized solution in order to produce an adequate solution.

The possible solutions depend on the number of points to be visited. For example, given 3 addresses to be visited, one can take 6 different routes. The number of different routes is calculated by calculating the permutations of 3 numbers (where repetition is not allowed). FIGS. 1A through 1F show 6 different routes traversing 3 different points, all starting from the same starting point. The distance traveled varies from route to route: 8.73 miles (FIG. 1A), 8.33 miles (FIG. 1B), 7.03 miles (FIG. 1C), 5.84 miles (FIG. 1D), 6.77 miles (FIG. 1E) and 6.79 miles (FIG. 1F). One can see that even in this simple example of starting from a given location and identifying the best route to cover 3 additional locations, the difference between the shortest route (5.84 miles, FIG. 1D) and the longest distance (8.73 miles, FIG. 1A) can be very significant and making the right or wrong selection may result in a significant savings (or loss) of resources.

The above example, considered only the distance covered. In reality, other considerations and preferences may also affect the selection of an optimal route, for example, the shortest time (calculating traffic speed at given times on given routes), the amount of time to be spent in each location (meetings, unloading or receiving merchandize), using or avoiding toll roads etc.

When considering travelling to 10 points, the number of permutations ($10!=10*9*8*7*6*5*4*3*2$) is 3,628,800. It is thus obvious that when dealing with a large number of points (dozens, hundreds, thousands), there is a huge number of possible routes. Sorting through all possible routes to find an optimal solution may take even a strong computer a long amount of time. In certain scenarios, for example, when a user requests a response online, the user expects to get a response back within a short delay such as under one minutes or under 3 or 5 minutes. There is thus a need to provide a route solution for travelling to a large number of points, within a short amount of time (under 5, 3 or 1 minute).

Too many possible solutions, cannot be performed in real-time.

Need to reduce # of possibilities.

Option #1, use clustering. Reduce 1,000 points to 100 by creating 10 clusters.

SUMMARY OF INVENTION

It is an object of the present invention to provide a recommended route among a plurality of points.

It is another object of the present invention to provide a recommended route among a plurality of points in less than one minute.

It is a further object of the present invention to provide a recommended route among a plurality of points in less than one minute by first reducing the number of possible routes to be considered.

It is yet another object of the present invention to provide a recommended route among a plurality of points in less than one minute by first reducing the number of possible routes to be considered using a clustering algorithm.

The present invention thus relates to a computerized method for calculating via a processor and memory a route via a plurality of points, each point associated with a geocode, the method comprising the steps of:

(i) presetting a predefined number of clusters C;

(ii) calculating by a processor based on the geocodes of all points, the C most remote points from each other, each of the calculated remote points becoming a cluster's initial center point;

(iii) assigning each point to a cluster, such that all clusters have a substantially equal number of points initially;

(iv) for each point, moving the point to a different cluster if the distance of said point to the cluster's center point is minimized;

(v) recalculating for each cluster its new center point;

(vi) repeating steps iv and v until there are no more movements of points possible;

(vii) presetting a number of steps forward S;

(viii) finding the minimum distance, time or both from the beginning to the end connecting all the clusters' center points, wherein from each current point the next point is calculated by looking ahead for the best S points following the current point;

(ix) repeating steps vii and viii for different values of S;

(x) repeating steps i to ix with different values of C;

(xi) recording the accumulated distance and/or accumulated time for each route calculated in step viii;

(xii) selecting an optimal route according to a predetermined user based on any combination of accumulated time and accumulated distance; and (xiii) calculating for the optimal route, the final route going through all the points in each cluster, not only the center point.

In some embodiments, the number of clusters C is predefined.

In some embodiments, the number of steps S is predefined.

In some embodiments, the starting point and/or ending points are predetermined.

In some embodiments, the maximum travel time per day is predetermined and the method produces a multi-day route plan.

In some embodiments, each points includes further characteristics such as service time, weight of merchandise to be picked up.

In some embodiments, the route planning takes into account said characteristics.

In another aspect, the present invention relates to a non-transitory machine readable storage medium having stored thereon a computer program for calculating via a processor and memory a route via a plurality of points, each point associated with a geocode, the computer program comprising a routine of set instructions for causing the machine to perform the steps of:

(i) presetting a predefined number of clusters C;

(ii) calculating by a processor based on the geocodes of all points, the C most remote points from each other, each of the calculated remote points becoming a cluster's initial center point;

(iii) assigning each point to a cluster, such that all clusters have a substantially equal number of points initially;

(iv) for each point, moving the point to a different cluster if the distance of said point to the cluster's center point is minimized;

(v) recalculating for each cluster its new center point;

(vi) repeating steps iv and v until there are no more movements of points possible;

(vii) presetting a number of steps forward S;

(viii) finding the minimum distance, time or both from the beginning to the end connecting all the clusters' center points, wherein from each current point the next point is calculated by looking ahead for the best S points following the current point;

(ix) repeating steps vii and viii for different values of S;

(x) repeating steps i to ix with different values of C;

(xi) recording the accumulated distance and/or accumulated time for each route calculated in step viii;

(xii) selecting an optimal route according to a predetermined user based on any combination of accumulated time and accumulated distance; and calculating for the optimal route, the final route going through all the points in each cluster, not only the center point.

MODES FOR CARRYING OUT THE INVENTION

Figure 1A:
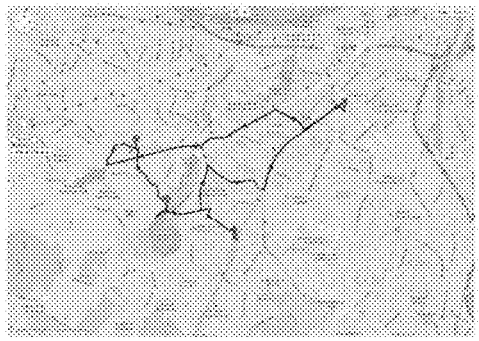
FIGS. 1A-1F show the 6 possible routes linking 4 points, with a fixed starting point.
Figure 1B:
Figure 1C:
Figure 1D:
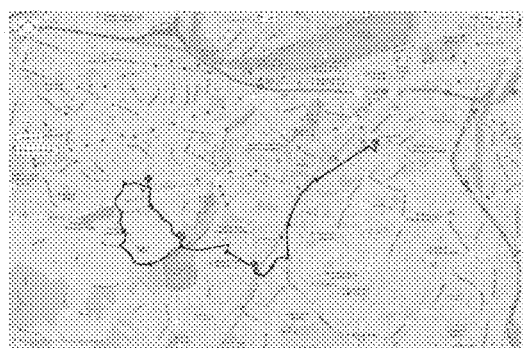
Figure 1E:
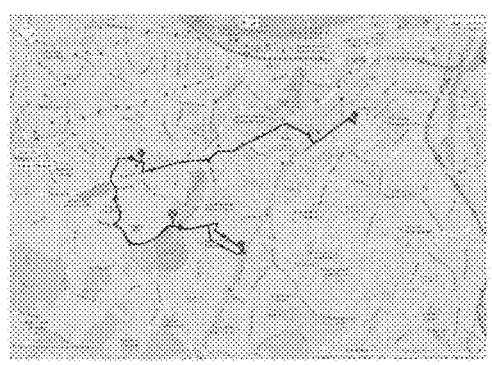
Figure 1F:
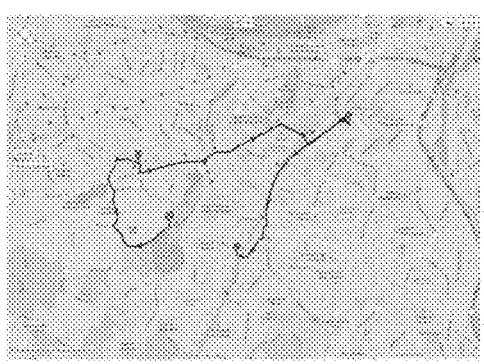

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to providing methods and systems for recommending a route through a plurality of points. As discussed above, even considering choosing a route among 10 points, one needs in theory to consider millions of alternative routes in order to recommend an efficient route. Faced with a very large numbers of alternative routes (millions and more), several approaches exists:

A first approach considers using a very powerful computer to go over each and every possible permutation and select the best one. Another approach considers reducing the number of options to be considered. One way is to use the permutation logic, but only consider a few (not all) steps forward at each considered position. Another option is to scale down the dimension of the data set such that only a fraction of the elements in the data set will actually be considered. This can be achieved by first clustering the different elements into a few groups (clusters) and then treat the group as a single element when considering routing options.

The routing methods and systems of the invention opt to reduce the number of routes considered by both grouping points into clusters first and also by only considering a few steps ahead when considering the next point to travel from each location. The result is a response that may not be the absolute best response, but a response that is a good response and a response that is provided back in adequate time so that a user of an online service can still get back a response within a time considered acceptable, for example, under one, three or five minutes.

The invention teaches calculating an efficient route travelling through a large number of addresses (over 10, over 50, over 100 and more). The efficient route calculated will probably not be the absolute best route possible, but it will be a good route calculated quickly online in an interactive application, and thus produce a good result, typically under one, three or five minutes.

The first step in the process is to reduce the large number of points (addresses) to a much smaller number that can be more efficiently calculated. This is achieved by creating groups of addresses (also referred to as clusters). Each cluster contains a plurality of neighbor addresses. Thus from a large data set, say 200 addresses, we can deal with 5-10 clusters. The invention discloses (below) a particular clustering mechanism, though the invention encompasses using any presently known clustering algorithm or one developed in the future.

The next step relates calculating an efficient route according to the predetermined criteria preferred by the user. Such criteria can be any combination of minimum distance traveled, minimum time traveled and any other particular requirements (estimated time to be spent at each location in case of meetings, delivery time constraints such as must reach that location before noon etc.). Theoretically, the absolute best way to calculate the next point from a given point is to review all possible steps ahead in order to identify the best one. In reality, this process might be too time consuming and resource intensive to be able to be used in an online service where the user expects a response within a short amount of time such as under one, three or five minutes. In order to provide a good solution (even if it is not the absolute best solution), the invention calls for verifying only a limited number of steps ahead, for example, 7, 8, 9 or 10 steps ahead only.

There are several ways according to the invention to calculate a recommended route. In some embodiments, either the number of clusters or the number of steps ahead looked at, or both are fixed in advance. For example, one may decide to group a data set of 500 addresses to 10 clusters, and only look ahead 5 steps where trying to figure out the next location to travel to from a given point. In some embodiments, several values of cluster numbers and several values of steps ahead are compared. For example, an online application of the invention might take a data set of 200 points, and initially divide it into 8 clusters. Then the best route will be calculated by looking at 7, 8, 9 or 10 steps ahead, thus producing 4 results. Then the application might divide the data set into 9, 10 and 11 clusters, each time calculating routes while looking at 7, 8, 9 or 10 steps ahead. The application will then look at the 16 routes produced (4 clusters*4 values of steps ahead), and select among these 16 routes the best route.

The present invention thus relates to a computerized method for calculating via a processor and memory a route via a plurality of points, each point associated with a geocode. A geocode includes the geographic coordinates of an address, that is the longitude and latitude values. Optionally, another value, height value, can also be part of the geocode data.

Figure 2:
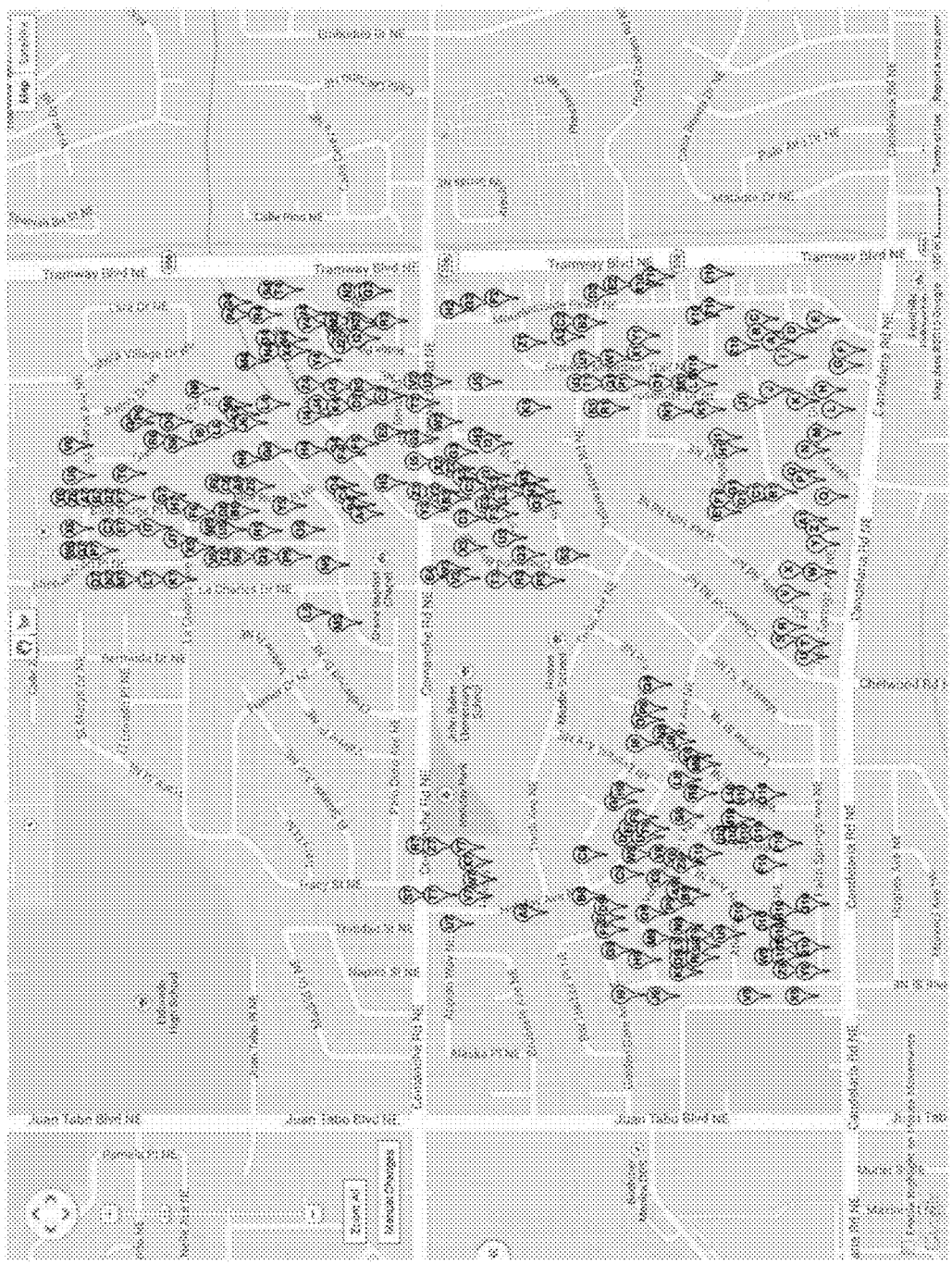
FIG. 2 shows a map with a plurality of points to be visited.

FIG. 2 shows an example of a map where a plurality of points (addresses) are marked.

The method of the invention comprises the following steps:

Clustering—the following steps disclose a clustering embodiment, though it should be considered that the invention encompasses any existing or future clustering method.

Figure 3:
FIG. 3 shows the same points on the map organized into clusters according to the invention.

(i) Presetting a predefined number of clusters C. The initial number chosen should be relatively small, for example, any value between 5 and 15. When the number of clusters increases, more options (routes) are calculated and compared. More routes to compare means better results but more time and resources to produce the solution, hence depending on the computer platform (strength of processor, memory speed etc.), size of the data set and desired response time the user can increase or decrease the number of clusters in order to provide a response within the desired time frame. FIG. 3 shows the same points of FIG. 2 organized into clusters, each cluster shown in a different color.

(ii) Calculating based on the geocodes of all points, the C most remote points from each other, each of the calculated remote points becoming a cluster's initial center point. In this step, using each point's geocode data, the distance is calculated to each of the other points in the data set. After which, C points are selected so that the total distance between them is maximized. Each of the selected cluster points, is considered to be the cluster's initial center point.

(iii) Assigning each point to a cluster, such that all clusters have a substantially equal number of points initially. In this step, the data set is divided into C clusters, all with equally (as possible) number of points. For example, if there are 241 points in the data set, and we wish to divide them into 9 clusters, 7 clusters will initially have 27 points, while 2 clusters will have 26 points.

(iv) For each point, moving the point to a different cluster if the distance of said point to the cluster's center point is minimized. In this step, we look at each point, and compare its distance from its current cluster center point, to center points of neighboring clusters. If the point, say in cluster 5, is actually closer to the center point of cluster 7 then to the center point of cluster 5, the point will be moved to cluster 7.

(v) Recalculating for each cluster its new center point. After looking at each point and checking whether to move it to a neighboring cluster or to keep it in the same cluster, a new center point is calculated for each cluster, reflecting any point(s) moved into or removed from the cluster.

(vi) Repeating steps iv and v until there are no more movements of points possible. When a point is moved from one cluster to another cluster, both clusters' center points are changed and need to be recalculated to take into account the addition/removal of points from the cluster. Once a new cluster center point is calculated, steps iv and v need to be performed again to see if any point should be moved from one cluster to another. Once all points are closer to their own cluster center point compared to neighboring clusters' center points, step vi is completed. It is to be noted, that if clusters start in step iii with an equal (or close to equal) number of points, after step vi, the number of points in any cluster can be any value. There could be clusters with many points and clusters with few points, depending on the distribution of the addresses.

Minimum Distance/Time Phase—the following steps relate to calculating for each point the recommend next point to travel. Typically, the predetermined selection criteria relate minimizing the distance travel and/or minimizing travel time. As discussed above, additional, particular factors may also be considered in the selection of the next point.

(vii) Presetting a number of steps forward S. As discussed above, the invention reduces the number of steps ahead S checked when selecting the next point, in order to consider less option and provide a final route within an acceptable time for an interactive application. For example, the method may verify only 7, 8, 9, 10 and/or 11 steps ahead.

Figure 4:
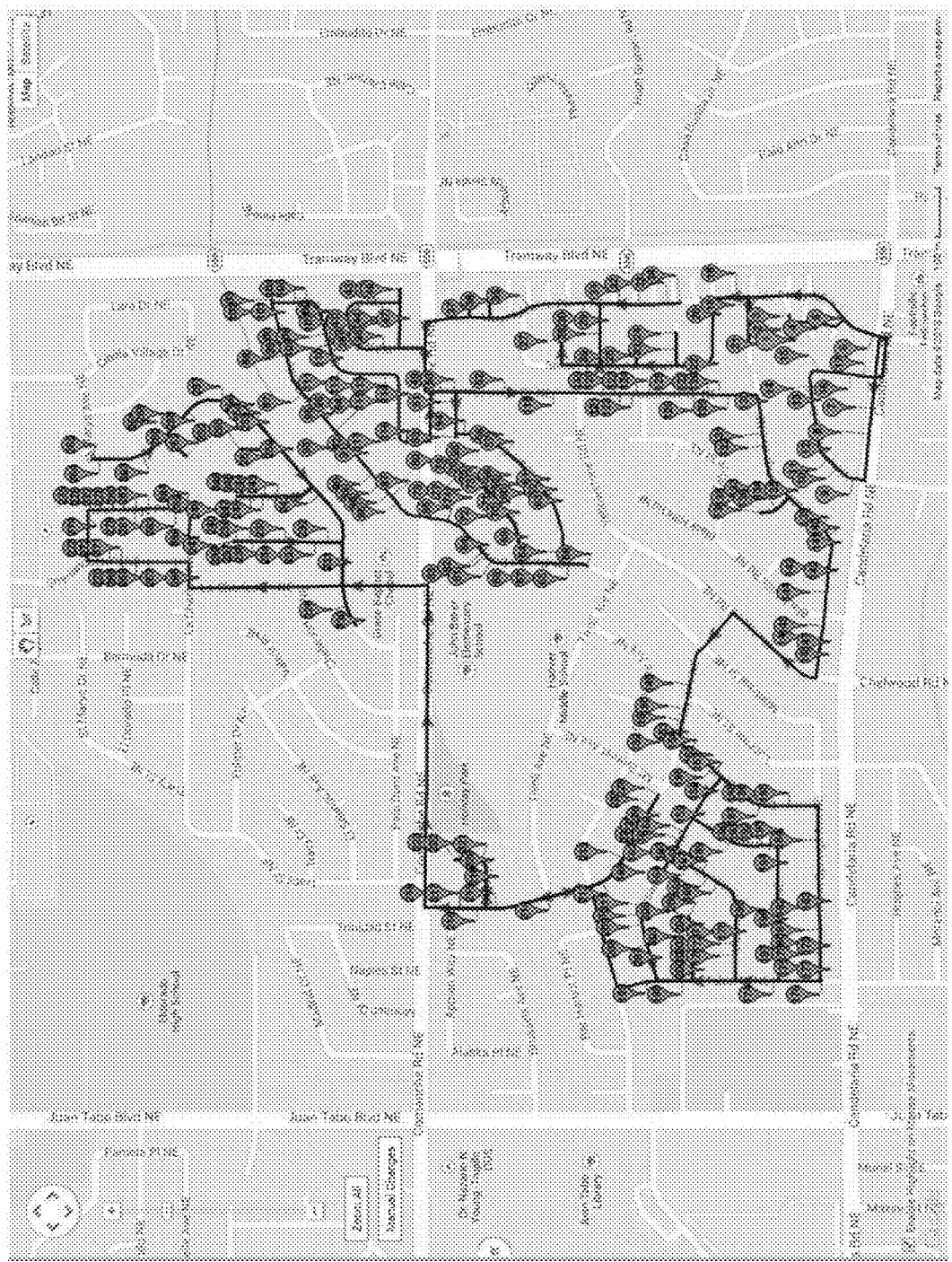
FIG. 4 shows an example of a route on a map, as calculated according to the invention.

(viii) Finding the minimum distance, time or both from the beginning to the end connecting all the clusters' center points, wherein from each current point the next point is calculated by looking ahead for the best S points following the current point. The predetermined selection criteria can be either the shortest distance traveled, the shortest time traveled or any combination (for example, 70% shortest distance and 30% shortest time). In addition, other particular criteria can be factored in. If S=7, when selecting the next point to travel from a given point, only the next 7 stops ahead are calculated and compared. It could be that the next point chosen is the best one considering the next 7 points ahead, but if we calculated 15 points ahead we would have chosen a better next point/route. The method of the invention may thus produce a route that is less efficient than the absolute best, in return for producing the response much faster. FIG. 4 shows an example of a route connecting all the clusters' center points.

(ix) Repeating steps vii and viii for different values of S. Steps vii and vii can be run with different values of S, for example, considering 7, 8, 9, 10 steps ahead.

(x) Repeating steps i to ix with different values of C. The entire process from steps i to ix is run by selecting a different initial number of clusters.

(xi) Recording the accumulated distance and/or accumulated time for each route calculated in step viii. The results are recorded for each scenario (variable number of clusters, variable number of steps ahead looked at for calculating the next location to go to).

(xii) Selecting an optimal route according to a predetermined user based on any combination of accumulated time and accumulated distance. After reviewing all the results of step xi, the best route can be chosen. Deciding which route is best depends on the predetermined criteria of minimizing distance traveled, time traveled or any combination including factoring particular requirements (arrive by noon, avoid toll roads, consider weight of merchandize to deliver, etc.).

Figure 5:
FIG. 5 shows an example of a multiple suggested routes on a map, as calculated according to the invention.

(xiii) Calculating for the optimal route, the final route going through all the points in each cluster, not only the center point. In steps i to xii all the calculations are based on travelling to all cluster center points only. In this step, once the order of the cluster travel is known, we look inside each cluster and calculate the order inside the cluster how to travel from point to point. Travel inside the cluster can be computed in many ways, for example, looking simply at the closest point, calculating only several points ahead etc. Alternatively, the entire method of the invention can be applied to a single cluster, considering the points of a cluster as an initial data set. FIG. 5 shows an example of a final route among all points of the dataset. The solution shown encompasses multiple routes, along with additional data about each route.

The method of the invention can include particular requirements such as: dividing the entire route into a predetermined amount of routes, for example, if needed to be divided among several drivers; the number of points in each route can be predetermined, for example, if a truck can contain at most 20 packages, it does not make sense to plan a route with more than 20 delivery addresses; the time duration of a route may be fixed, for example, a professional driver may not legally be allowed to drive more than a given number of hours per day; the total volume and/or weight of merchandize for a route may be predetermined, also each address may have ordered a different order and the route's delivery requirement should match the delivery vehicle's capabilities; the number of hours per day/route can be fixed, thus producing multi-day routes if necessary; legal breaks, meal breaks may be factored into a route; travel distance can be calculated using any unit (km/miles); the predetermined criteria for route selection can be any combination of minimum distance/minimum time/balance of distance & time/keep order as is; territories can be marked in advance and the method may or may not plan routes through mixed territories; the route logic can also include specific requirements such as travel from start point to nearest point, or travel from start point to farthest point first in order to finish the route at the starting point.

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The invention claimed is:

1. A computerized method for calculating, via a processor and memory, a route via a plurality of points, each point associated with a geocode, the method comprising the steps of:
   (i) presetting a predefined number of clusters C;
   (ii) calculating by a processor based on the geocodes of all points, the C most remote points from each other, each of the calculated remote points becoming a cluster's initial center point;

(iii) assigning each point to a cluster, such that all clusters have a substantially equal number of points initially;
(iv) for each point, moving the point to a different cluster if the distance of said point to the cluster's center point is minimized;
(v) recalculating for each cluster its new center point;
(vi) repeating steps iv and v until there are no more movements of points possible;
(vii) presetting a number of steps forward S;
(viii) finding the minimum distance, time or both from the beginning to the end connecting all the clusters' center points, wherein from each current point the next point is calculated by looking ahead for the best S points following the current point;
(ix) repeating steps vii and viii for different values of S;
(x) repeating steps i to ix with different values of C;
(xi) recording the accumulated distance and/or accumulated time for each route calculated in step viii;
(xii) selecting an optimal route according to a predetermined user based on any combination of accumulated time and accumulated distance; and
(xiii) calculating for the optimal route, the final route going through all the points in each cluster, not only the center point.

2. The method of claim 1, wherein the starting point and/or ending points are predetermined.

3. The method of claim 1, wherein the maximum travel time per day is predetermined and the method produces a multi-day route plan.

4. The method of claim 1, wherein each points includes further characteristics such as service time or weight of merchandise to be picked up.

5. The method of claim 4, wherein the route planning takes into account said characteristics.

6. A non-transitory machine readable storage medium having stored thereon a computer program for calculating, via a processor and memory, a route via a plurality of points, each point associated with a geocode, the computer program comprising a routine of set instructions for causing the machine to perform the steps of:

(i) presetting a predefined number of clusters C;
(ii) calculating by a processor based on the geocodes of all points, the C most remote points from each other, each of the calculated remote points becoming a cluster's initial center point;
(iii) assigning each point to a cluster, such that all clusters have a substantially equal number of points initially;
(iv) for each point, moving the point to a different cluster if the distance of said point to the cluster's center point is minimized;
(v) recalculating for each cluster its new center point;
(vi) repeating steps iv and v until there are no more movements of points possible;
(vii) presetting a number of steps forward S;
(viii) finding the minimum distance, time or both from the beginning to the end connecting all the clusters' center points, wherein from each current point the next point is calculated by looking ahead for the best S points following the current point;
(ix) repeating steps vii and viii for different values of S;
(x) repeating steps i to ix with different values of C;
(xi) recording the accumulated distance and/or accumulated time for each route calculated in step viii;
(xii) selecting an optimal route according to a predetermined user based on any combination of accumulated time and accumulated distance; and
(xiii) calculating for the optimal route, the final route going through all the points in each cluster, not only the center point.

7. The machine readable storage of claim 6, wherein the starting point and/or ending points are predetermined.

8. The machine readable storage of claim 6, wherein the maximum travel time per day is predetermined and the method produces a multi-day route plan.

9. The machine readable storage of claim 6, wherein each points includes further characteristics such as service time or weight of merchandise to be picked up.

10. The machine readable storage of claim 6, wherein the route planning takes into account said characteristics.

* * * * *